(12) United States Patent
Little et al.

(10) Patent No.: US 8,747,163 B2
(45) Date of Patent: Jun. 10, 2014

(54) CARD CONNECTOR ASSEMBLY FACILITATING HEAT DISSIPATION OF INSERTED CARD

(75) Inventors: Terrance F. Little, Fullerton, CA (US); Stephen Sedio, Valley Center, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 33 days.

(21) Appl. No.: 13/554,186

(22) Filed: Jul. 20, 2012

(65) Prior Publication Data
US 2014/0024236 A1    Jan. 23, 2014

(51) Int. Cl.
*H01R 24/00* (2011.01)
(52) U.S. Cl.
USPC .......................................... 439/630; 439/159
(58) Field of Classification Search
USPC .......................................... 439/159, 160, 630
See application file for complete search history.

(56) References Cited

U.S. PATENT DOCUMENTS

| | | | |
|---|---|---|---|
| 6,669,494 B2 * | 12/2003 | Abe | 439/159 |
| 6,890,203 B2 * | 5/2005 | Matsunaga et al. | 439/331 |
| 7,384,294 B2 * | 6/2008 | Washino et al. | 439/326 |
| 7,473,115 B2 * | 1/2009 | Yu et al. | 439/188 |
| 7,901,225 B2 | 3/2011 | Maruyama | |
| 8,052,475 B2 * | 11/2011 | Chan | 439/630 |
| 8,142,229 B1 | 3/2012 | Bobuk et al. | |
| 8,167,643 B2 | 5/2012 | Yoshida et al. | |
| 8,246,366 B2 * | 8/2012 | Tsai et al. | 439/159 |
| 8,251,720 B2 * | 8/2012 | Yu et al. | 439/159 |
| 8,287,293 B1 * | 10/2012 | Gao et al. | 439/159 |
| 2010/0087074 A1 | 4/2010 | Yu et al. | |

* cited by examiner

*Primary Examiner* — Thanh Tam Le

(57) ABSTRACT

A card connector assembly includes a card connector (100) and a memory card (5) received in the card connector. The card connector includes an insulative housing (2), a number of contacts (3) retained in the insulative housing, a slider (41) assembled on the insulative housing and movable relative to the insulative housing, a spring (42) urging the slider along a card ejection direction; and a metal shell (7) covering the insulative housing for defining a card receiving space. The metal shell includes a spring leaf (711, 712) extending into the card receiving space. The memory card forms a metal plate (52) on a top surface thereof and a number of metal traces (51) on a bottom surface thereof. The metal plate is located above the metal traces along a vertical direction and the spring leaf contacts with the metal plate.

17 Claims, 8 Drawing Sheets

CARD CONNECTOR ASSEMBLY FACILITATING HEAT DISSIPATION OF INSERTED CARD

CROSS-REFERENCE TO RELATED APPLICATIONS

This patent application relates to a U.S. patent application Ser. No. 13/158,505, filed on Jun. 13, 2011, entitled "CARD CONNECTOR WITH REAR LATCH" and relates to a U.S. Pat. No. 8,142,229, filed on Jul. 12, 2011, entitled "CARD CONNECTOR WITH CAM FEATURE FOR FACILITATING INSERTION OF A CARD", which are assigned to the same assignee as this application.

BACKGROUND OF THE INVENTION

1. Field of the Invention

The present invention relates generally to a card connector assembly, and more particularly to a card connector assembly which facilitates heat dissipation of an inserted card.

2. Description of Related Arts

A micro SD card is widely used in an electronic device today. However, data transmission speed of the micro SD card only achieves 104 MB/s, which can not meet increasing requirement of customers. Presently, JEDEC (Joint Electronic Device Engineering Council) association is establishing a new UFS (Universal Flash Storage) card standard aiming at developing a memory card called a UFS card whose data transmission speed achieves 3 GB/s, which is much higher than 104 MB/s of the micro SD card. As the UFS card has so high data transmission speed, quantity of heat is quickly accumulated on a top surface of the UFS card, especially focused at an area which is above a lot of metal traces thereof.

U.S. Pat. No. 8,167,643 issued to Yoshida et al. on May 1, 2012, discloses a card connector which is assembled on a printed circuit board for receiving an IC card. The IC card comprises a plurality of contacting pads and an area having the contacting pads is usually a heart-focused area. The printed circuit board comprises a plurality of contact points at a front edge thereof. The card connector comprises a plurality of contacts for connecting with the contacting pads of the IC card and the contact points of the printed circuit board. A heat dissipating pad is formed at a middle part of the printed circuit board. The heat dissipating pad is arranged below the IC card when the IC card is received in the card connector.

Hence, a new card connector assembly facilitating heat-sink of a memory card is desired.

SUMMARY OF THE INVENTION

Accordingly, an object of the present invention is to provide a card connector assembly facilitating heat-sink of a memory card.

To achieve the above object, a card connector assembly includes a card connector and a memory card received in the card connector. The card connector includes an insulative housing, a number of contacts retained in the insulative housing, a slider assembled on the insulative housing and movable relative to the insulative housing, a spring urging the slider along a card ejection direction; and a metal shell covering the insulative housing for defining a card receiving space. The metal shell includes a spring leaf extending into the card receiving space. The memory card forms a metal plate on a top surface thereof and a number of metal traces on a bottom surface thereof. The metal plate is located above the metal traces along a vertical direction and the spring leaf contacts with the metal plate.

Other objects, advantages and novel features of the invention will become more apparent from the following detailed description when taken in conjunction with the accompanying drawings.

DETAILED DESCRIPTION OF THE PREFERRED EMBODIMENT

Figure 1:
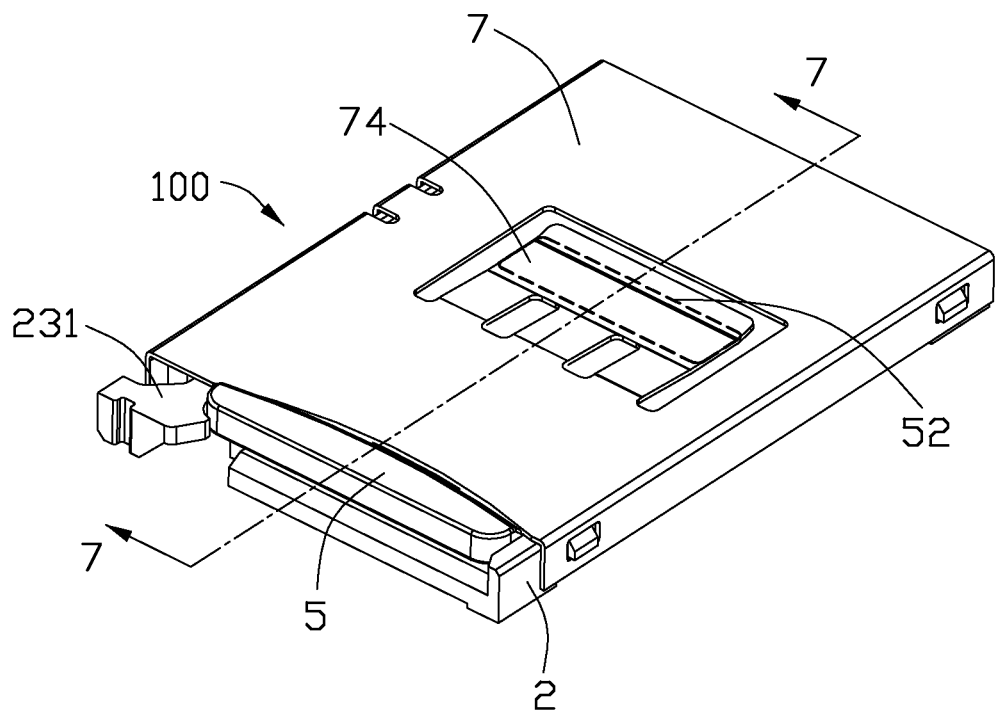
FIG. 1 is a perspective, assembled view of a card connector assembly constructed in accordance with the present invention.
Figure 2:
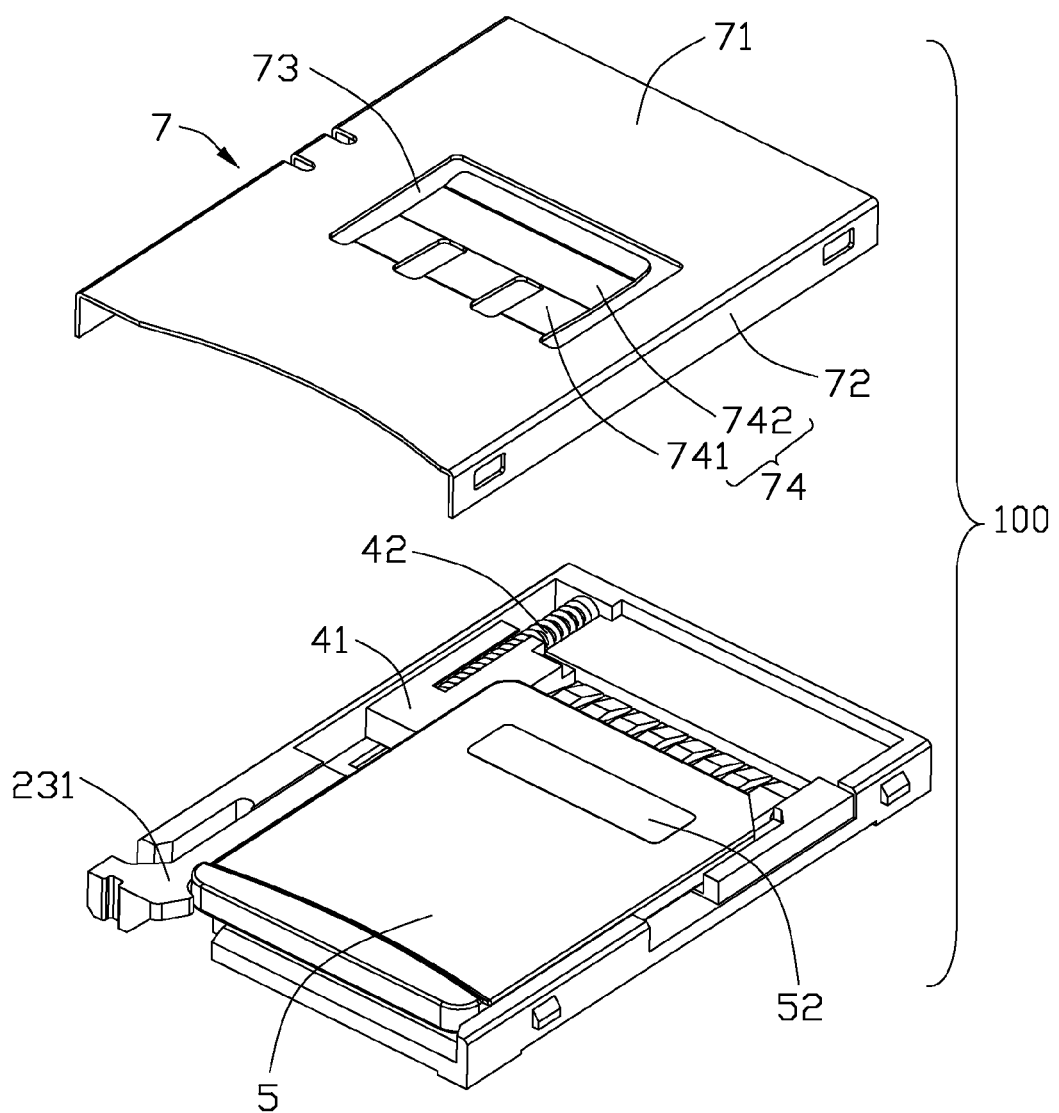
FIG. 2 is a perspective, partly exploded view of the card connector assembly when a metal shell is removed away from other parts thereof.
Figure 3:
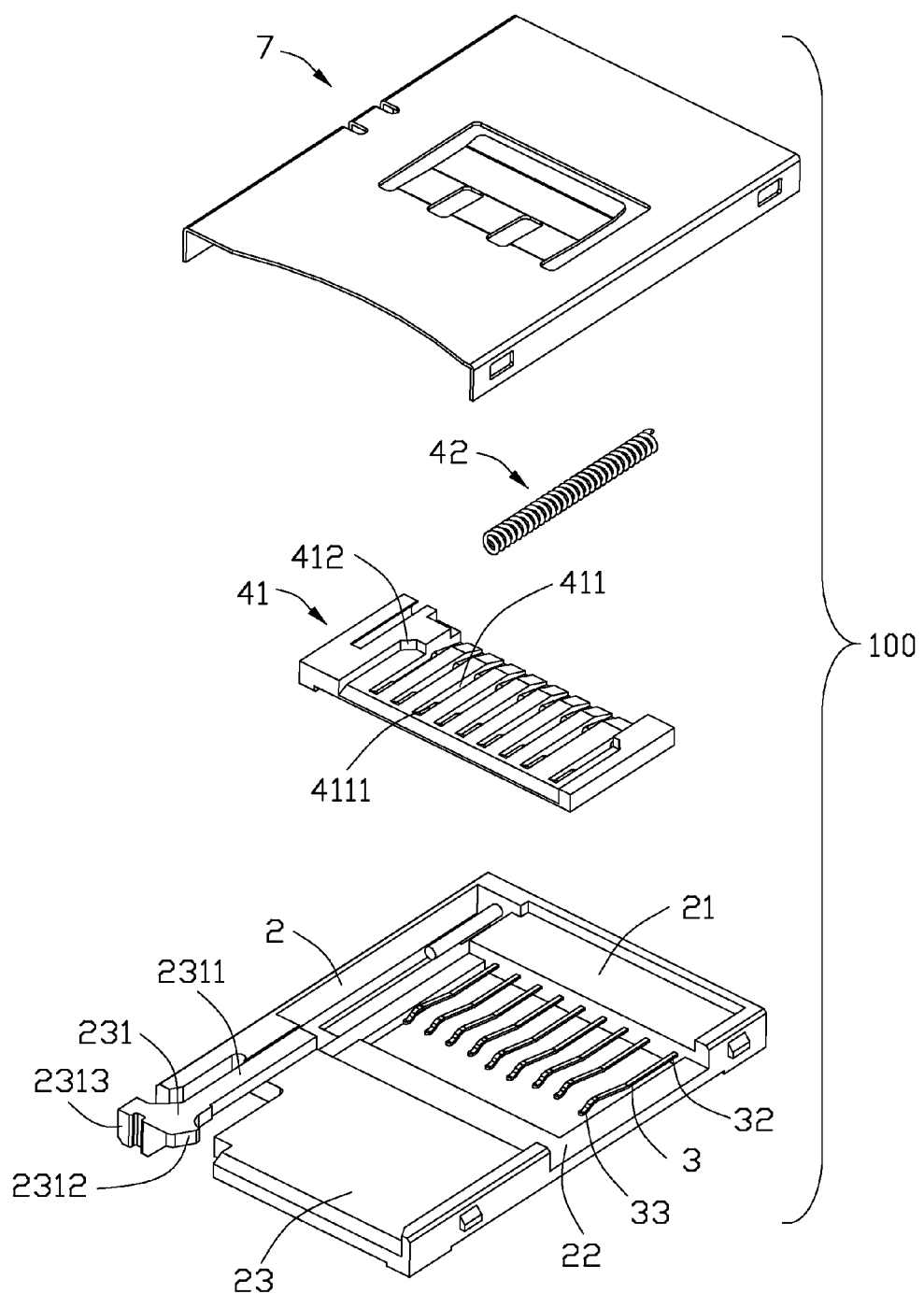
FIG. 3 is a perspective, exploded view of the card connector.
Figure 4:
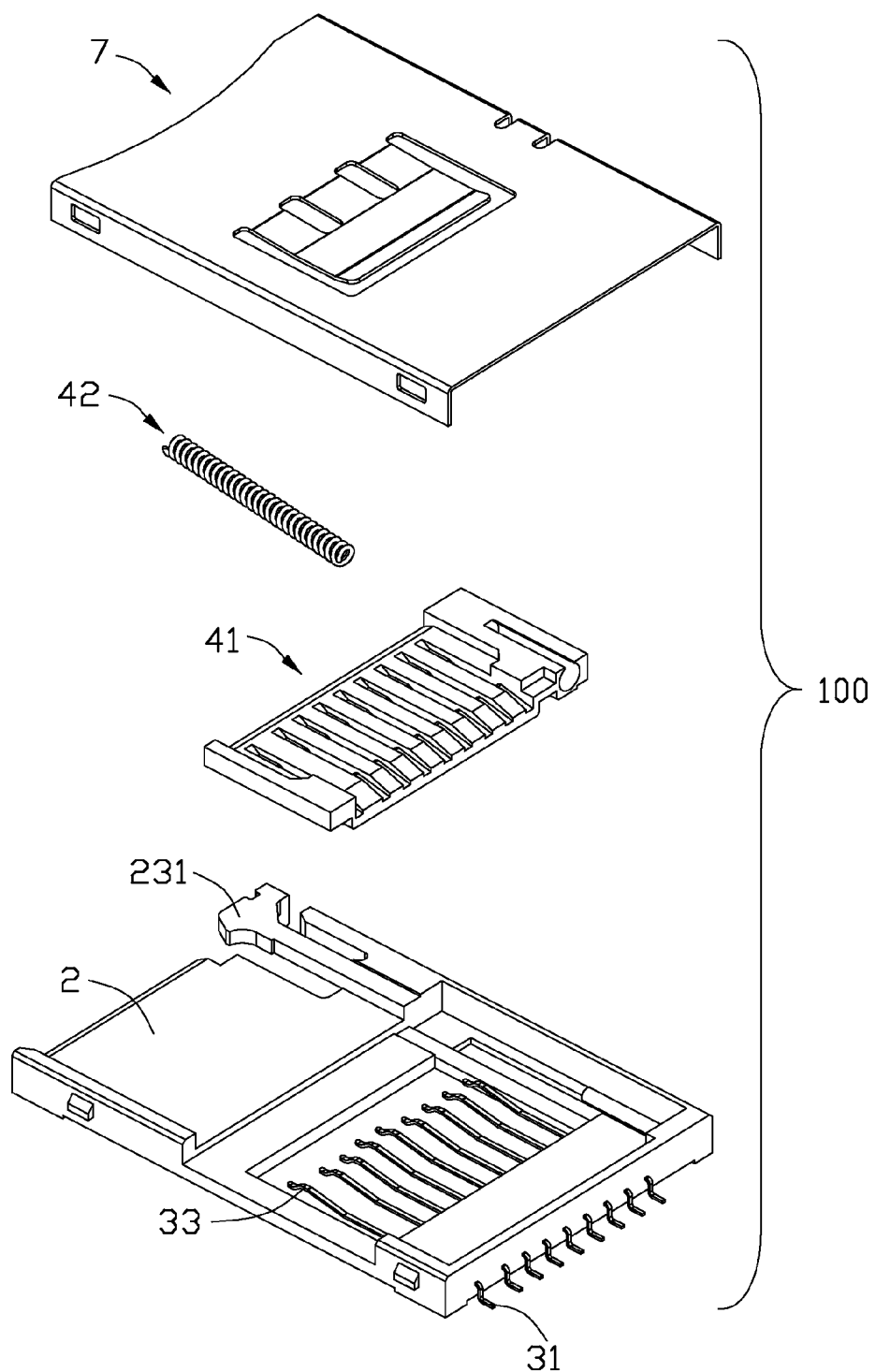
FIG. 4 is another perspective, exploded view of the card connector.

Reference will now be made in detail to the preferred embodiment of the present invention.

Referring to FIGS. 1-8, a card connector assembly in accordance with the present invention comprises an electrical card connector 100 and a memory card 5 received in the electrical card connector 100. The memory card 5 is being established by JEDEC (Joint Electronic Device Engineering Council) association. The memory card 5 is proposed to have a data transmission speed high to 3 GB/s. The electrical card connector 100 comprises an insulative housing 2, a plurality of contacts 3 received in the insulative housing 2, a slider 41 assembled on the insulative housing 2 and movable relative to the insulative housing 2 along a card insertion/ejection direction, a spring 42 urging the slider 41 along the card ejection direction, and a metal shell 7 covering the insulative housing 2 for defining a card receiving space (not labeled).

Referring to FIGS. 3, 4, 7, and 8, the insulative housing 2 comprises a front retaining portion 21, a middle supporting portion 22, and a rear securing portion 23 positioned along the card insertion/ejection direction. The contacts 3 have a plurality of soldering portions 31 extending out of the insulative housing 2, a plurality of connecting portions 32 retained in the retaining portion 21, and a plurality of contacting portions 33 extending rearward upwardly towards the supporting portion 22. The slider 41 is assembled on the supporting portion 22 and is movable forward on the insulative housing 2 such that the contacting portions 32 are raised up by the slider 41 for connecting with the memory card 5. The insulative housing 2 forms a rear latch 231 at a lateral side of the securing portion 23. The rear latch 231 comprises a flexible arm 2311 integral with the insulative housing 2, a card lock 2312 inwardly formed at the free end of the flexible arm 2311, and an operating portion 2313 formed at the free end of the flexible arm 2311 which is opposite to the card lock 2312. The flexible arm 2311 abuts against the card receiving space and is deflectable away from the card receiving space when the card lock 2312 or the operating portion 2313 is pushed for giving away to the memory card 5. The card lock 2312 protrudes towards the card receiving space and is capable of being secured with the memory card 5.

Referring to FIGS. 3, 4, 7, and 8, the slider 41 is assembled on the supporting portion 22 and is movable on the insulative housing 2. The slider 41 defines a plurality of recesses 411 extending along the card insertion/ejection direction for receiving the contacting portions 33 of the contacts 3. The slider 41 forms a cam 4111 in each recess 411. The contacting portions 33 are raised upwardly into the card receiving space by the cams 4111 for connecting with the memory card 5. The slider 41 comprises a confronting portion 412 at a front, left side thereof The memory card 5 confronts with the confronting portion 412 for pushing the slider 41 to move along the card insertion direction and the confronting portion 412 reversely pushes the memory card 5 to move along the card ejection direction. During the movement of the slider 41 along the card insertion direction, the spring 42 is compressed to have elasticity. The elasticity of the spring 42 is released and therefore, the spring 42 urges the slider 41 to move along the card ejection direction.

Figure 5:
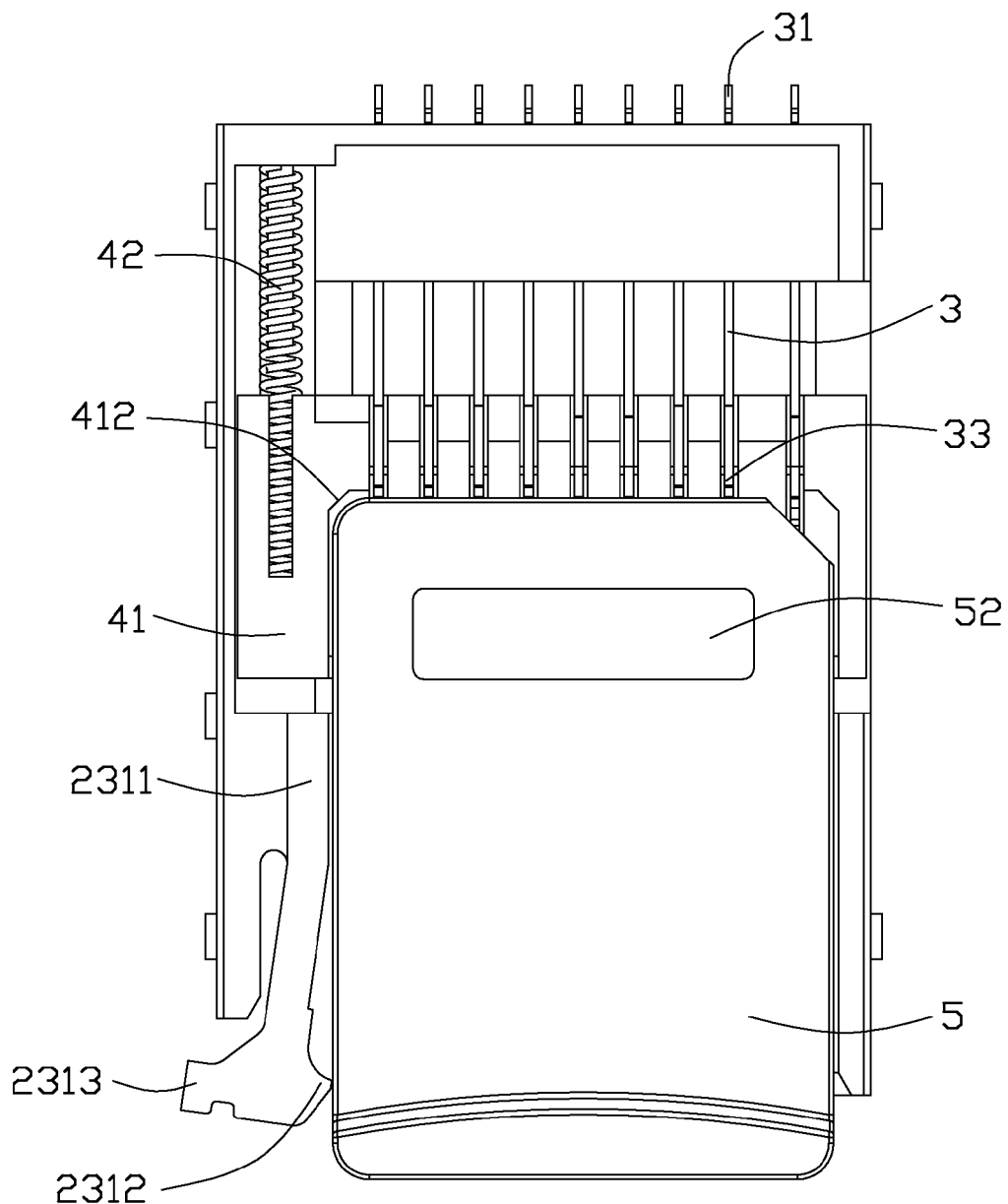
FIG. 5 is a first top plan view of the card connector when a memory card is initially inserted and the metal shell is not shown.
Figure 6:
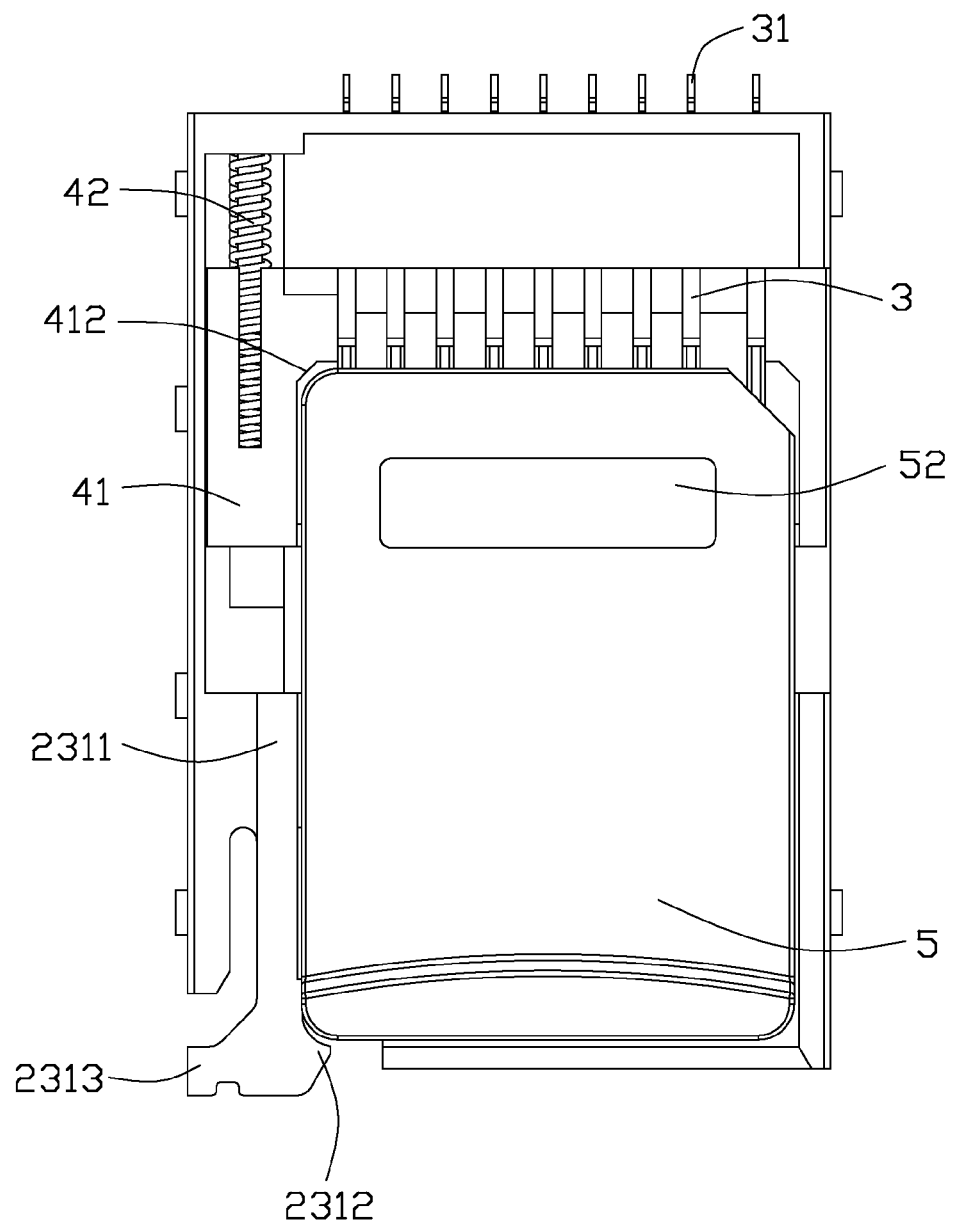
FIG. 6 is a second top plan view of the card connector when the memory card is fully inserted and the metal shell is not shown.
Figure 7:
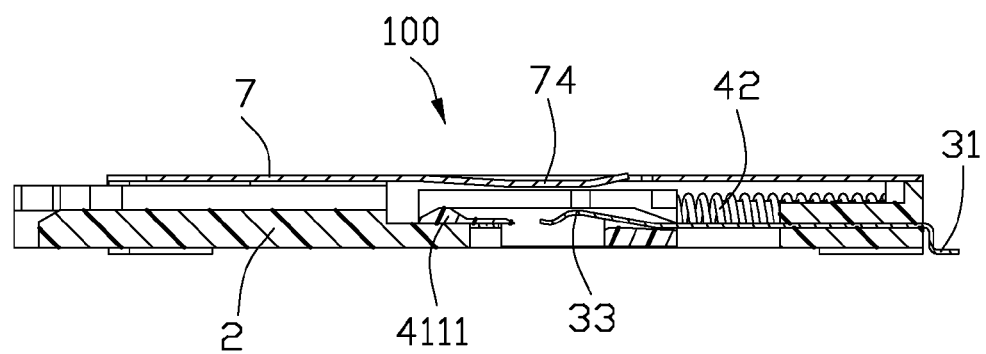
FIG. 7 is a cross-sectional view of the card connector when the memory card is not inserted.
Figure 8:
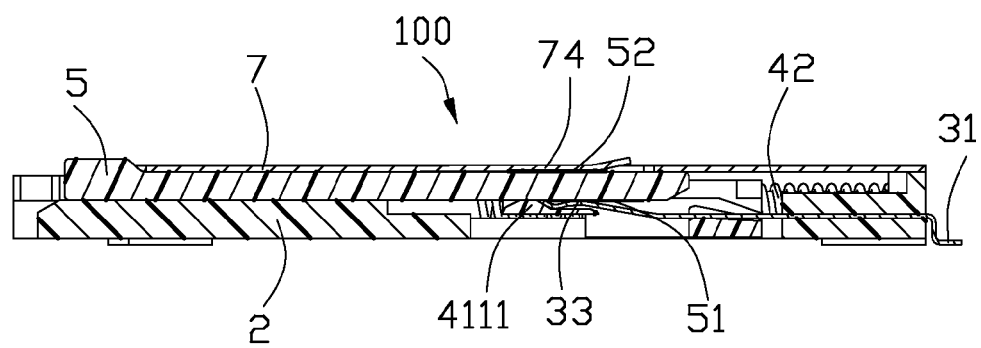
FIG. 8 is another cross-sectional view of the card connector when the memory card is fully inserted.

Referring to FIGS. 5 and 6, showing a process that the memory card 5 is inserted into the card receiving space. The memory card 5 begins to be inserted into the card receiving space, the front edge of the memory card 5 pushes the card lock 2312 outwardly and the flexible arm 2311 is deflected away from the card receiving space for giving away for the memory card 5. When the memory card 5 is initially inserted as FIG. 5, the memory card 5 confronts the confronting portion 412 of the slider 41 and begins to drive the slider 41 to move along the card insertion direction. The spring 42 becomes compressed and has elasticity. When the memory card 5 is fully inserted as FIG. 6, the flexible arm 2311 returns back to its original position and the card lock 2312 is secured with the rear edge of the memory card 5. The contacting portions 33 of the contacts 3 are raised upwardly for connecting with the memory card 5. When the memory card 5 is ejected, a user pushed the operating portion 2313 outwardly by a finger and the flexible arm 2311 is deflected outwardly. The elasticity of the spring 42 is released for ejecting the memory card 5.

Referring to FIGS. 1, 2, 7 and 8, the metal shell 7 comprises a base portion 71 and a pair of vertical walls 72 bending vertically from two edges of the base portion 71. The base portion 71 defines an aperture 73 at the middle thereof The metal shell 7 forms a spring leaf 74 in the aperture 73. The spring leaf 74 extends towards the card receiving space for connecting with the memory card 5. The spring leaf 74 comprises at least one longitudinal arm 741 connecting to the base portion 71 and a transverse arm 742 perpendicular to the at least one longitudinal arm 741. The at least one longitudinal arm 741 are inclined such that the transverse arm 742 is located lower than the base portion 71 when the memory card is not inserted. The at least one longitudinal arm 741 are flexible. Therefore, the transverse arm 742 is raised up by the memory card 5 when the memory card 5 is fully inserted in the card receiving space. The memory card 5 comprises a plurality of metal traces 51 on a bottom surface which faces the insulative housing 2 and a metal plate 52 attached on a top surface which faces the metal shell 7. The metal traces 51 are connected with the contacting portions 33 of the contacts 3 for signal transmission. The metal plate 52 is located above the metal traces 51 along a vertical direction which is perpendicular to the card insertion/ejection direction. Because metal is better than plastic in heat conduction, when the spring leaf 74 of the metal shell 7 contacts with the metal plate 52 of the memory card 5, heat-sink is quickly drawn from the memory card 5 in case that heat of the memory card 5 is focused at an area above the metal traces 51 of the memory card 5.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector assembly comprising:
   a card connector comprising:
      an insulative housing;
      a plurality of contacts retained in the insulative housing;
      a slider assembled on the insulative housing and movable relative to the insulative housing;
      a spring urging the slider along a card ejection direction; and
      a metal shell covering the insulative housing for defining a card receiving space, the metal shell comprising a spring leaf extending into the card receiving space; and
   a memory card received in the card connector along a card insertion direction opposite to the card ejection direction, the memory card forming a metal plate on a top surface thereof and a plurality of metal traces on a bottom surface thereof contacting with the contacts; wherein
   the metal plate is substantially aligned with the metal traces along a vertical direction perpendicular to the card insertion/ejection direction and the spring leaf contacts with the metal plate of the memory card for heat dissipation.

2. The card connector assembly as claimed in claim 1, wherein the spring leaf comprises at least one longitudinal arm and a transverse arm perpendicular to the at least one longitudinal arm.

3. The card connector assembly as claimed in claim 2, wherein the metal shell comprises a base portion and the transverse arm is located lower than the base portion.

4. The card connector assembly as claimed in claim 1, wherein the card connector comprises a rear latch having a card lock extending to a rear edge of the memory card for securing with the rear edge of the memory card.

5. The card connector assembly as claimed in claim 4, wherein the rear latch comprises a flexible arm integral with the insulative housing, the flexible arm having a free end, and the card lock is formed at the free end of the flexible arm.

6. The card connector assembly as claimed in claim 5, wherein the slider and the insulative housing together define a card receiving space and the flexible arm is deflectable away from the card receiving space.

7. The card connector assembly as claimed in claim 6, wherein the card lock protrudes towards the card receiving space and the rear latch comprises an operating portion formed at the free end of the flexible arm opposite to the card lock.

8. The card connector assembly as claimed in claim 7, wherein the contacts are raised up into the card receiving space during a movement of the slider along a card insertion direction.

9. The card connector assembly as claimed in claim 7, wherein the slider comprises a confronting portion which the memory card confronts with for pushing the slider along the card insertion direction and for the slider to push the memory card out of the card receiving space along the card ejection direction.

10. The card connector assembly as claimed in claim 7, wherein the card lock is pushed by a front edge of the memory card outwardly at the beginning of the insertion of the memory card.

11. An electrical card connector assembly comprising:
an electronic card having a metal plate on an upper surface thereof and a plurality of metal traces on a lower surface thereof;
an insulative housing defining a mating face;
a plurality of contacts disposed in the housing and having contacting sections extending beyond the mating face for contacting with the metal traces;
a metallic shell assembled to the housing and cooperating with the mating face to commonly define a card receiving space therebetween for receiving the electronic card along a front-to-back direction, the metallic shell comprising a base portion and an opening defined in the base portion;
a spring leaf suspended in the opening and unitarily extending from the shell, the spring leaf comprising at least one longitudinal arm and a transverse arm for contacting with the metal plate of the electronic card for heat dissipation;
the contacting sections defining, via the corresponding contacting apexes, a first contacting line in a transverse direction perpendicular to said front-to-back direction, and the spring leaf defining a second contacting line in the transverse direction; wherein
the first contacting line and the second contacting line are substantially aligned with each other in a vertical direction perpendicular to both said front-to-back direction and said transverse direction for respectively exerting opposite forces, in the vertical direction, upon the electronic card in a balanced manner.

12. The electrical card connector assembly as claimed in claim 11, further including a slider with a cam structure to support the contacting sections of said contact, wherein said slider is adapted to be urged to move by the electronic card when the electronic card is inserted into the card receiving space.

13. The electrical card connector assembly as claimed in claim 12, further including a spring to constant urge the slider to move rearwardly.

14. The electrical card connector assembly as claimed in claim 13, further including a spring locking arm for locking a rear edge of the electronic card when the electronic card is fully received in the card receiving space.

15. The electrical card connector assembly as claimed in claim 11, wherein the spring leaf defines the second contacting line continuously while the contacting sections define the first contacting line interruptedly.

16. The electrical card connector assembly as claimed in claim 15, wherein the second contacting lines extends with more than one half of a width of the shell in said transverse direction.

17. The electrical card connector assembly as claimed in claim 11, wherein the spring leaf defines a contacting area extending in both the front-to-back direction and said transverse direction for contacting the electronic card for efficient heat dissipation under condition that said second contacting line is a part of said contacting area.

* * * * *